United States Patent
Sugimoto

(10) Patent No.: US 6,751,440 B2
(45) Date of Patent: Jun. 15, 2004

(54) APPARATUS AND METHOD FOR SELECTING TARGET EDUCATIONAL COURSE

(75) Inventor: Koichi Sugimoto, Tokyo (JP)

(73) Assignee: Fujitsu Limited, Kawasaki (JP)

(*) Notice: Subject to any disclaimer, the term of this patent is extended or adjusted under 35 U.S.C. 154(b) by 103 days.

(21) Appl. No.: 09/779,846

(22) Filed: Feb. 9, 2001

(65) Prior Publication Data

US 2002/0045155 A1 Apr. 18, 2002

(30) Foreign Application Priority Data

Aug. 24, 2000 (JP) ........................................ 2000-253278

(51) Int. Cl.⁷ ............................................. G09B 19/00
(52) U.S. Cl. ........................................ 434/362; 434/323
(58) Field of Search ................................ 434/362, 322, 434/323, 350, 307; 463/23

(56) References Cited

U.S. PATENT DOCUMENTS

| | | | | |
|---|---|---|---|---|
| 4,618,988 A | * | 10/1986 | Schiller | 382/125 |
| 5,742,776 A | * | 4/1998 | Toda | 705/1 |
| 5,823,781 A | * | 10/1998 | Hitchcock et al. | 434/118 |
| 5,855,011 A | * | 12/1998 | Tatsuoka | 706/45 |
| 6,072,113 A | * | 6/2000 | Tohgi et al. | 84/470 R |
| 6,322,366 B1 | * | 11/2001 | Bergan et al. | 434/118 |
| 2002/0016759 A1 | * | 2/2002 | Macready et al. | 705/37 |

OTHER PUBLICATIONS

Robert F. Murphy, Multivariate Distance and Similarity, Cytomtry Development Workshop 2000, http://www.murphylab.web.cmu.edu/CDW/CDW00/–Presentations/02MurphyMultivariateDistanc.ppt, download form the Internet Apr. 23, 2003, pp. 9–11.*
Kenji Ohtomo. "Introduction to the Item Response Theory." Jul. 10, 1996. pp. 16–21.

* cited by examiner

Primary Examiner—Jessica Harrison
Assistant Examiner—Steven Ashburn
(74) Attorney, Agent, or Firm—Staas & Halsey, LLP

(57) ABSTRACT

A storage unit stores educational course selection premise information about a condition of a skill required as a premise of taking an educational course. A skill information obtaining unit obtains skill information about a skill of a person who plans to take an educational course. The similarity between the educational course selection premise information and the skill information is checked. That is, it is checked how the skill of the person who plans to take an educational course is similar to the condition of the skill required as a premise of taking the educational course. An educational course having high similarity (that is, having a high similarity level) is selected as an educational course to be taken by the person who plans to take an educational course.

12 Claims, 12 Drawing Sheets

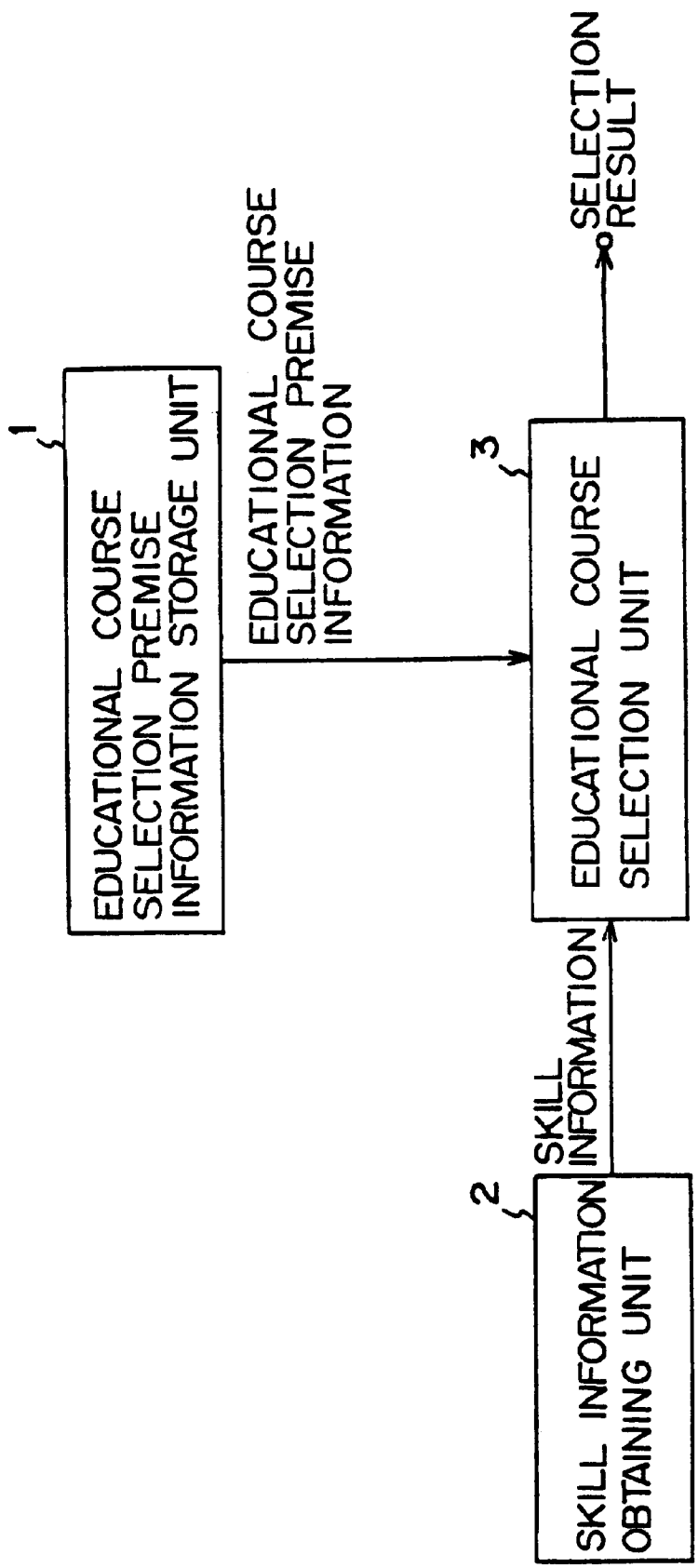
F I G. 1

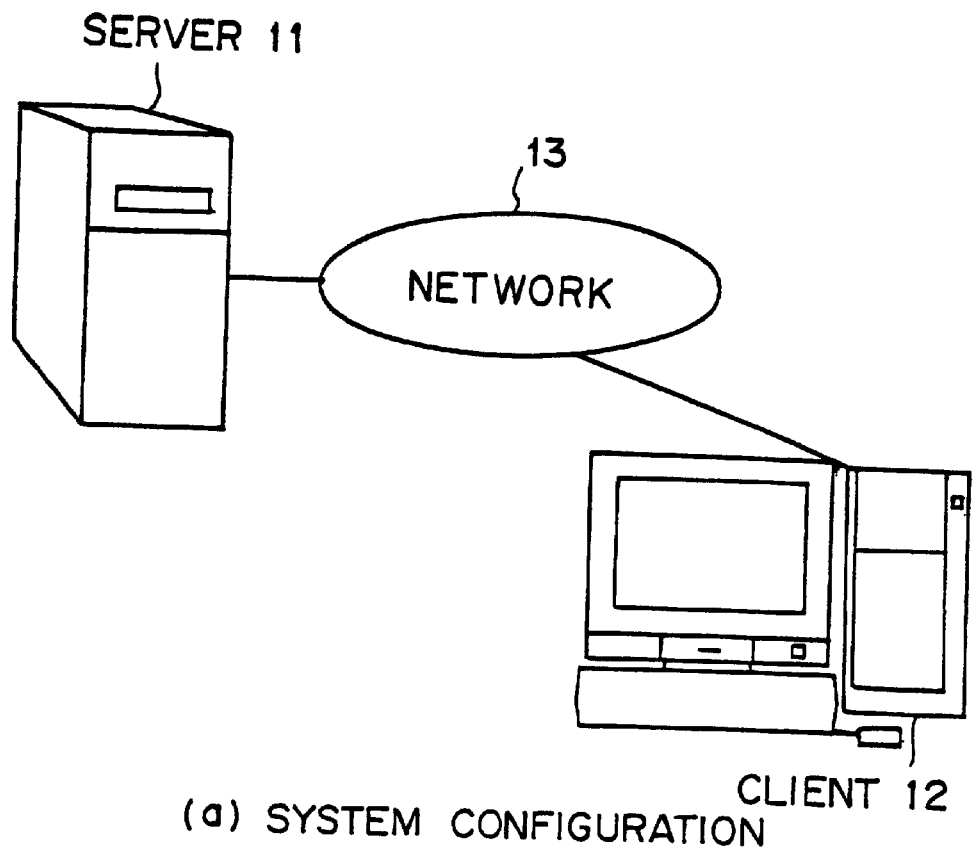
(a) SYSTEM CONFIGURATION
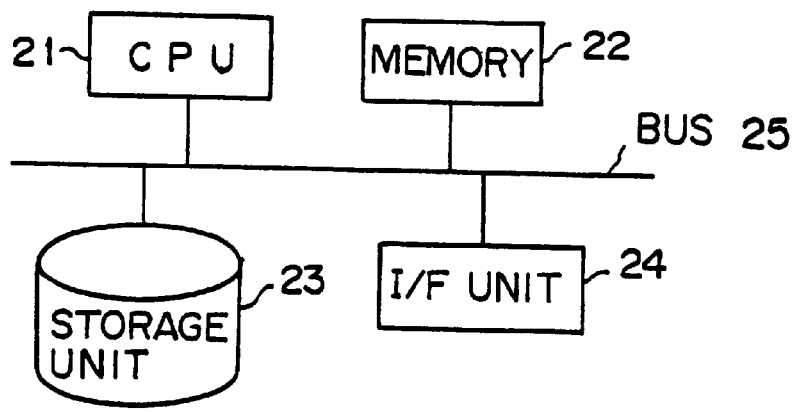
(b) INTERNAL CONFIGURATION OF SERVER
FIG. 2

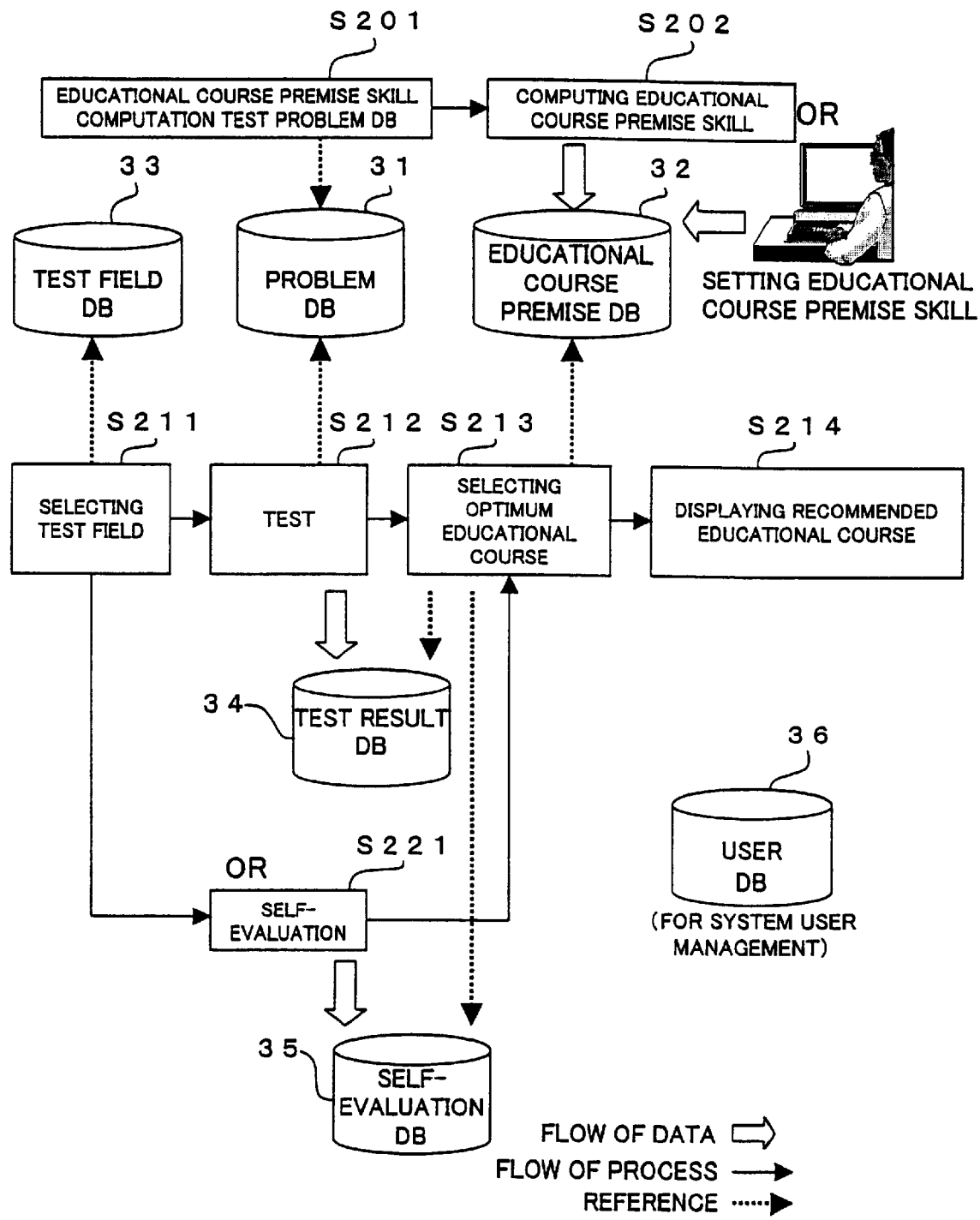
F I G. 5

| DATABASE | TABLE |
|---|---|
| PROBLEM DB | (1) PROBLEM TABLE |
| | (2) PROBLEM SELECTION ITEM TABLE |
| | (3) TEST DEFINITION TABLE |
| | (4) TEST CATEGORY DEFINITION TABLE |
| | (5) CATEGORY NAME TABLE |
| | (6) TEST PROBLEM DEFINITION TABLE |
| TEST FIELD DB | (7) FIELD NAME TABLE |
| USER DB | (8) USER TABLE |
| TEST RESULT DB | (9) USER TEST RESULT HISTORY TABLE |
| | (10) USER ANSWER TABLE |
| SELF-EVALUATION DB | (11) SELF-EVALUATION QUESTION TABLE |
| | (12) SELF-EVALUATION SELECTION ITEM TABLE |
| | (13) USER SELF-EVALUATION HISTORY TABLE |
| | (14) USER SELF-EVALUATION RESULT TABLE |
| EDUCATIONAL COURSE PREMISE DB | (15) COURSE INFORMATION DEFINITION TABLE |
| | (16) EDUCATIONAL COURSE PREMISE TABLE |
| | (17) EDUCATIONAL COURSE PREMISE TEST TABLE |
| | (18) EXTRACT PREMISE TABLE |

FIG. 6

(1) PROBLEM TABLE

| PROBLEM ID | PROBLEM SENTENCE | NUMBER OF SELECTION ITEMS | NUMBER OF CORRECT SELECTION ITEMS | CATEGORY ID |
|---|---|---|---|---|

(2) PROBLEM SELECTION ITEM TABLE

| PROBLEM ID | SELECTION ITEM NUMBER | CONTENTS OF SELECTION ITEMS |
|---|---|---|

(3) TEST DEFINITION TABLE

| TEST ID | TEST NAME | FIELD ID | LIMIT TIME | NUMBER OF PROBLEMS | NUMBER OF CATEGORIES |
|---|---|---|---|---|---|

(4) TEST CATEGORY DEFINITION TABLE

| TEST ID | NUMBER | CATEGORY NAME |
|---|---|---|

(5) CATEGORY NAME TABLE

| CATEGORY ID | CATEGORY NAME |
|---|---|

(6) TEST PROBLEM DEFINITION TABLE

| TEST ID | PROBLEM ID | SEQUENCE NUMBER |
|---|---|---|

(7) FIELD NAME TABLE

| FIELD ID | FIELD NAME |
|---|---|

(8) USER TABLE

| USER ID | PASSWORD | NAME(KANJI) | NAME(KANA) | MAIL ADDRESS |
|---|---|---|---|---|

(9) USER TEST RESULT HISTORY TABLE

| USER ID | DATE | TIME | TEST ID | ABILITY VALUE | LEVEL | NUMBER OF ANSWERS | NUMBER OF NUN-ANSWERS | USED TIME | NUMBER OF CORRECT ANSWERS | NUMBER OF INCORRECT ANSWERS |
|---|---|---|---|---|---|---|---|---|---|---|

(10) USER ANSWER TABLE

| USER ID | PROBLEM ID | ANSWER SELECTION ITEMS | RESULT(CORRECT ANSWER, INCORRECT ANSWER, NUN-ANSWER) | SEQUENCE NUMBER |
|---|---|---|---|---|

(11) SELF-EVALUATION QUESTION TABLE

| EVALUATION ID | EVALUATION ITEM NUMBER | CONTENTS OF QUESTIONS | NUMBER OF SELECTION ITEMS(NUMBER OF EVALUATION LEVELS) |
|---|---|---|---|

(12) SELF-EVALUATION SELECTION ITEM TABLE

| EVALUATION ID | EVALUATION ITEM NUMBER | SELECTION ITEM NUMBER | CONTENTS OF SELECTION ITEMS(DEFINITION OF EVALUATION LEVEL) |
|---|---|---|---|

(13) USER SELF-EVALUATION HISTORY TABLE

| USER ID | DATE | TIME | EVALUATION ID | SELF-EVALUATION TOTAL LEVEL | NUMBER OF QUESTIONS | USED TIME |
|---|---|---|---|---|---|---|

(14) USER SELF-EVALUATION RESULT TABLE

| USER ID | EVALUATION ID | EVALUATION ITEM NUMBER | SELF-EVALUATION LEVEL |
|---|---|---|---|

(15) COURSE INFORMATION DEFINITION TABLE

| COURSE ID | COURSE NAME (EDUCATIONAL COURSE NAME) |
|---|---|

(16) EDUCATIONAL COURSE PREMISE TABLE

| COURSE ID | FIELD ID | NUMBER OF CATEGORIES | NUMBER OF SELF-EVALUATION ITEMS |
|---|---|---|---|

(17) EDUCATIONAL COURSE PREMISE TEST TABLE

| COURSE ID | CATEGORY ID | PREMISE (PREMISE CORRECT ANSWER RATE) |
|---|---|---|

(18) EXTRACT PREMISE TABLE

| COURSE ID | EVALUATION ID | PREMISE (SELF-EVALUATION VALUE) |
|---|---|---|

F I G. 7

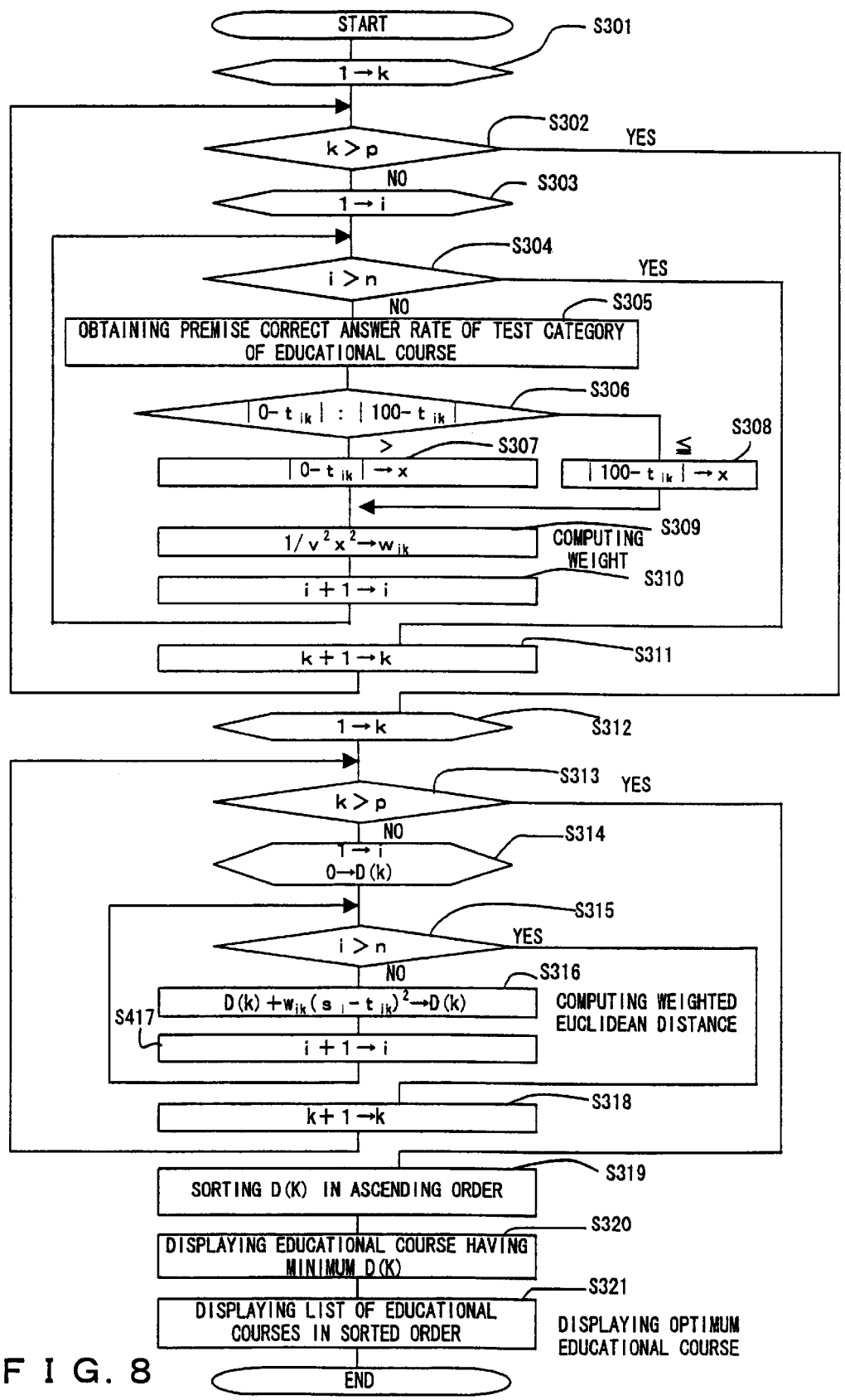
F I G. 8

(a) PREMISE SKILL LEVEL LIST
   (RESULT OF EDUCATIONAL COURSE PRE-TEST FOR EACH COURSE)

| no | TEST CATEGORY/ EDUCATIONAL COURSE | EDUCATIONAL COURSE 1 | EDUCATIONAL COURSE 2 | EDUCATIONAL COURSE 3 | EDUCATIONAL COURSE 4 |
|---|---|---|---|---|---|
| 1 | CATEGORY 1 | 40 | 60 | | |
| 2 | CATEGORY 2 | 40 | | | 60 |
| 3 | CATEGORY 3 | 30 | | 70 | |
| 4 | CATEGORY 4 | | 65 | 75 | |
| 5 | CATEGORY 5 | | | | 50 |

(b) TEST RESULT

| no | TEST CATEGORY/ EDUCATIONAL COURSE | ICHIRO | SHIRO |
|---|---|---|---|
| 1 | CATEGORY 1 | 30 | 40 |
| 2 | CATEGORY 2 | 35 | 50 |
| 3 | CATEGORY 3 | 34 | 60 |
| 4 | CATEGORY 4 | 20 | 70 |
| 5 | CATEGORY 5 | 30 | 60 |

F I G. 9

(a) PREMISE SKILL LEVEL LIST

| no | SKILL/ EDUCATIONAL COURSE | EDUCATIONAL COURSE 1 | EDUCATIONAL COURSE 2 | EDUCATIONAL COURSE 3 | EDUCATIONAL COURSE 4 |
|---|---|---|---|---|---|
| 1 | SKILL 1 | 2 | 3 | | |
| 2 | SKILL 2 | 2 | | | 3 |
| 3 | SKILL 3 | 1 | | 3 | |
| 4 | SKILL 4 | | 3 | 4 | |
| 5 | SKILL 5 | | | | 2 |

(b) RESULT OF SET OF QUESTIONS

| no | SKILL/ EDUCATIONAL COURSE | ICHIRO | SHIRO |
|---|---|---|---|
| 1 | SKILL 1 | 1 | 2 |
| 2 | SKILL 2 | 2 | 2 |
| 3 | SKILL 3 | 2 | 3 |
| 4 | SKILL 4 | 1 | 3 |
| 5 | SKILL 5 | 2 | 3 |

F I G. 1 1

APPARATUS AND METHOD FOR SELECTING TARGET EDUCATIONAL COURSE

BACKGROUND OF THE INVENTION

1. Field of the Invention

The present invention relates to a technology for performing optimum selection, and more specifically to a technology for selecting an appropriate lecture for a person who plans to have the lecture.

2. Description of the Related Art

In many corporations, educational plans including technical courses, education for freshmen, skill paths, etc. are commonly given to their employees. These education plans are costly, and take some time, thereby requiring efficient programs.

An educational course given as part of educational plans to employees (in the present invention, an educational course generally refers to educational classes for employees in which employees study, obtain technology, receive training, etc., and includes a lecture course, a training course, etc.) is given for each learning purpose in each field. In an example of an educational course of computer technology, for example, educational courses are open for each field such as system management, network technology, application development, database utilization, etc. These educational courses given for each technological field can be open for each of the primary, intermediate, and advanced courses depending on the skill levels of employees.

The employees taking these educational courses have selected the educational courses by themselves with their skill levels taken into account, or have taken the courses in order from the primary class.

However, when an employee selects and takes an educational course, there can be the possibility that he or she cannot keep up with the knowledge level of the contents of the selected lecture because, for example, he or she is poor in specific technology indispensable in understanding the contents of the lecture in the educational course, etc. Furthermore, when an employee takes an educational course in order from the primary course, the steps of the course can be too easy for the employee and time and educational expenses may be wasted.

SUMMARY OF THE INVENTION

The present invention has been developed to solve the above mentioned problems, and aims at appropriately selecting an educational course depending on the skill level of a person who plans to take the educational course.

The apparatus which is one of an aspect of the present invention selects an educational course to be taken by a person who plans to take the course includes: an educational course selection premise information storage unit for storing educational course selection premise information which is the information about the condition of the skill requested as the premise of selecting an educational course; a skill information obtaining unit for obtaining skill information which is the information about the skill of the person who plans to take the course; and an educational course selection unit for selecting an educational course to be selected by the person who plans to take the course based on the similarity between the educational course selection premise information and the skill information.

With the above mentioned configuration, the educational course selection unit checks the similarity between the educational course selection premise information and the skill information, that is, how the skill of the person who plans to take the course is similar to the condition of the skill requested as the premise of the educational course, and selects the educational course to be taken by the person who plans to take the course if the similarity is high (that is, if the similarity level is high). Therefore, it is possible that an appropriate educational course corresponding to the skill level of a person who plans to take the course can be selected and presented to the person who plans to take the course.

BRIEF DESCRIPTION OF THE DRAWINGS

The present invention will be more apparent from the following detailed description when the accompanying drawings are referenced.

FIG. 1 shows the configuration of the principle of the present invention;

FIG. 2 shows the configuration of the computer system embodying the present invention;

FIG. 5 shows the procedure of selecting an educational course on the user side;

FIG. 6 shows the table stored in each database;

FIG. 7 shows the details of each table;

FIG. 8 is a flowchart of the contents of the process of selecting an educational course to be taken;

FIG. 9 shows an example of a value to be used in explaining the selection of an educational course to be taken;

FIG. 11 shows an example of a value to be used in explaining the selection of an educational course to be taken based on self-evaluation.

DESCRIPTION OF THE PREFERRED EMBODIMENTS

Figure 3:
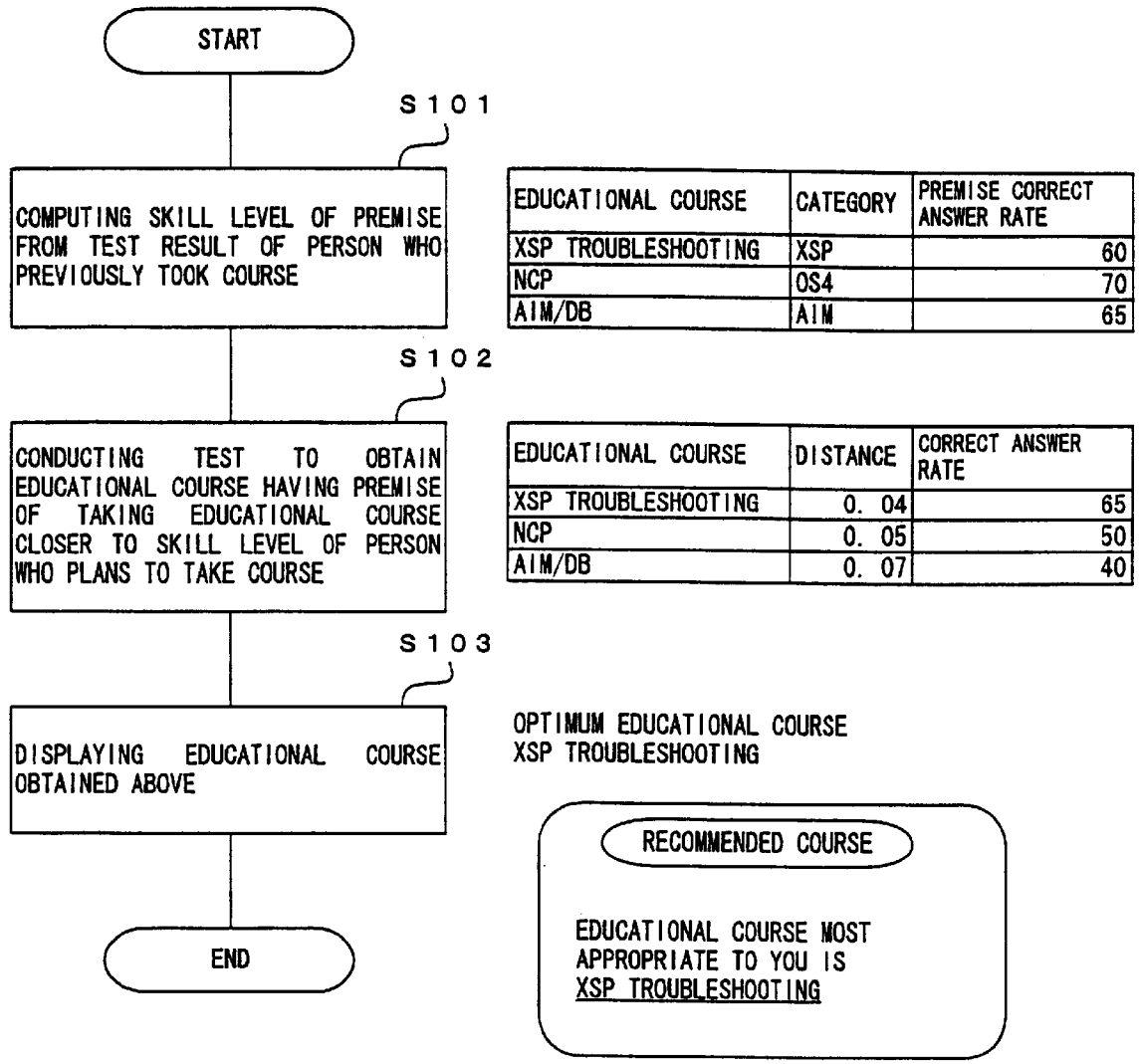
FIG. 3 shows the procedure of selecting the optimum educational course using the computer system shown in FIG. 2.

Described below is the configuration showing the principle of the present invention.

FIG. 1 shows the configuration indicating the principle of the present invention.

An educational course selection premise information storage unit 1 stores educational course selection premise information which is the information about the condition of the skill requested as the premise of selecting an educational course.

A skill information obtaining unit 2 obtains skill information which is the information about the skill of a person who plans to take a course.

An educational course selection unit 3 selects an educational course to be selected by a person who plans to take the course based on the similarity between the educational course selection premise information and the skill information.

The educational course selection premise information is generated based on, for example, the result of a test conducted for the persons who previously took a specified course.

With the configuration shown in FIG. 1, the educational course selection unit 3 checks the similarity between the educational course selection premise information and the skill information, that is, how the skill of the person who plans to take the course is similar to the condition of the skill requested as the premise of the educational course, and selects the educational course to be taken by the person who plans to take the course if the similarity is high (that is, if the similarity level is high). Therefore, it is possible that an appropriate educational course corresponding to the skill level of a person who plans to take the course can be selected and presented to the person who plans to take the course.

Assuming that the educational course selection premise information is a value indicating the correct answer rate of a test conducted for previous person who took the course, and the skill information can be given by representing a skill level by a value indicating the correct answer rate for all problems requiring the skill of the same category as the problem of the test conducted for the previous persons who took the course, the educational course selection unit 3 can be configured to select an educational course to be taken by a person who plans to take the course for which the difference is the smallest between the correct answer rate indicated by the educational course selection premise information and the correct answer rate indicated by the above mentioned skill information, thereby selecting an appropriate educational course.

Although the skill for which the condition is presented according to the educational course selection premise information has a plurality of categories, an appropriate educational course can be selected if the educational course selection unit 3 can select the educational course to be selected by the person who plans to take the course based on an average value of all categories relating to the similarity between the educational course selection premise information and the skill information in the same category.

In addition, the skill information can be generated based on the answers to the questions presented to a person who plans to take the course. At this time, the skill information can be the information about the skill of the person who plans to take the course if the questions are prepared such that they contain a request for self-evaluation of the skill of the person who plans to take the course.

Furthermore, the educational course selection unit 3 can be designed for convenience to allow a person who plans to take the course to select a plurality of educational courses in order as reference materials and finally select one from among the plurality of educational courses.

The above mentioned problem can also be solved by allowing a computer to execute, after reading from a computer readable storage medium, a program for directing a computer to control the function performed by each element forming part of the above mentioned present invention.

An embodiment of the present invention is described below by referring to the attached drawings. In this embodiment, an aspect for embodying the present invention in a computer system configured by a server and client connected through a network is described.

FIG. 2 shows the configuration of the computer system embodying the present invention.

In (a) of FIG. 2, a server 11 for providing various services and a client 12 using the services are connected to a network 13 such as Internet, Intranet, etc. for transmission and reception of data.

(b) of FIG. 2 shows the internal configuration of the server 11 for providing an educational course selection service according to the present invention. As shown in FIG. 2, the server 11 comprises a CPU 21, memory 22, a storage unit 23, and an I/F unit 24. Each of these components is connected to a bus 25 for mutual transmission and reception of data.

The CPU 21 is a central processing unit for controlling the entire operations of the server 11.

The memory 22 is a main storage device used by the CPU 21 as a work area when an operation control program of the server 11 read from the storage unit 23 is loaded or when the operation control program is executed.

The storage unit 23 is an auxiliary storage device storing the above mentioned operation control program and data configuring each database described later, and comprises, for example, a hard disk device.

The I/F unit 24 provides an interface function for connecting the server 11 to the network 13 for data transmission, receives data from the client 12, and transmits data to the client 12.

Described below is the method of selecting the optimum educational course using the computer system (hereinafter referred to simply as a present system) shown in FIG. 2. In this system, it is first determined whether or not a person who takes an educational course has an appropriate skill required as a premise of taking the educational course by conducting a test containing the problems relating to the technological fields of the educational course on the person who takes the course. Based on the test result, the optimum educational course can be selected and presented to the person who takes the course. The skill level required as a premise of selecting the educational course is grasped from the result of the test conducted on the person who previously took the course.

FIG. 3 shows the procedure of selecting the optimum educational course according to the present system.

In FIG. 3, (a) is a flowchart of the selecting procedure, and (b) shows a simple and practical example of the process in each step of (a). The procedure of selecting the optimum educational course is described below by referring to the flowchart (a) shown in FIG. 3.

First, based on the result of the test conducted on the person who previously took the course, the server 11 computes the skill level required as the premise of selecting an educational course.

In the example shown in (b), the persons who previously took the course 'XSP troubleshooting' have the correct answer rate of 60%, and a person having the correct answer rate closer to the value in this category (hereinafter referred to as a 'test category') is more acceptable for the educational course. The correct answer rate is hereinafter referred to as a premise correct answer rate.

Similarly, the person who previously took the course 'NCP' has the correct answer rate of 70% for the test belonging to the test category 'OS4', and the person who previously took the course 'AIM/DB' has the correct answer rate of 65% for the test belonging to the test category 'AIM'. Based on these premise correct answer rates, the premises of taking the educational course can be determined.

Then, a test is conducted on the person who plans to take the present course. If the information about the result of the test (the correct answer rate for each category of each problem of the test) is transmitted from the client 12 through the network 13, and the server 11 obtains the information, then the most appropriate educational course for the person who plans to take an educational course can be determined by the server 11 (S102).

In the example shown in (b), as a result of the test conducted for a person who plans to take an educational course, the correct answer rate of the test for grasping the necessary skill level for selecting the educational course 'XSP troubleshooting' is 65%, and the 'distance' between the test result and the premise correct answer rate obtained in the previous step is 0.04.

The 'distance' refers to a weighted Euclidean distance.

According to the present invention, an educational course to be taken is not selected simply depending on the relationship between the skill level of a person who plans to take the course and the skill level required by each educational course, but the aptitude of a person who plans to take the course is determined depending on the similarity between the skill levels, that is, to what extent the skill levels are similar. According to the embodiment of the present invention, the Euclidean distance is obtained between the test result and the premise to represent the similarity between the skill levels. The educational course corresponding to a shorter distance (smaller value) is selected as an appropriate educational course for the person who plans to take an educational course.

The weighted Euclidean distance between the test result and the premise of an educational course can be computed as follows.

$$d_k^2 = \sum_{i=1}^{n} W_{ik}(s_i - t_{ik})^2 \qquad \text{equation (1)}$$

where
- $d_k$ indicates the weighted Euclidean distance between the premise of an educational course k to be taken in the total number P of educational courses and the test result of a person who plans to take an educational course ($d_k \geq 0$);
- n indicates the total number of test categories to which each problem of a test belongs;
- $s_i$ indicates the correct answer rate [%] of the test belonging to the test category i in the test results of a person who plans to take an educational course; and
- $t_{ik}$ indicates the premise correct answer rate [%] of the test belonging to the test category i in the premise of taking the educational course k.

Figure 4:
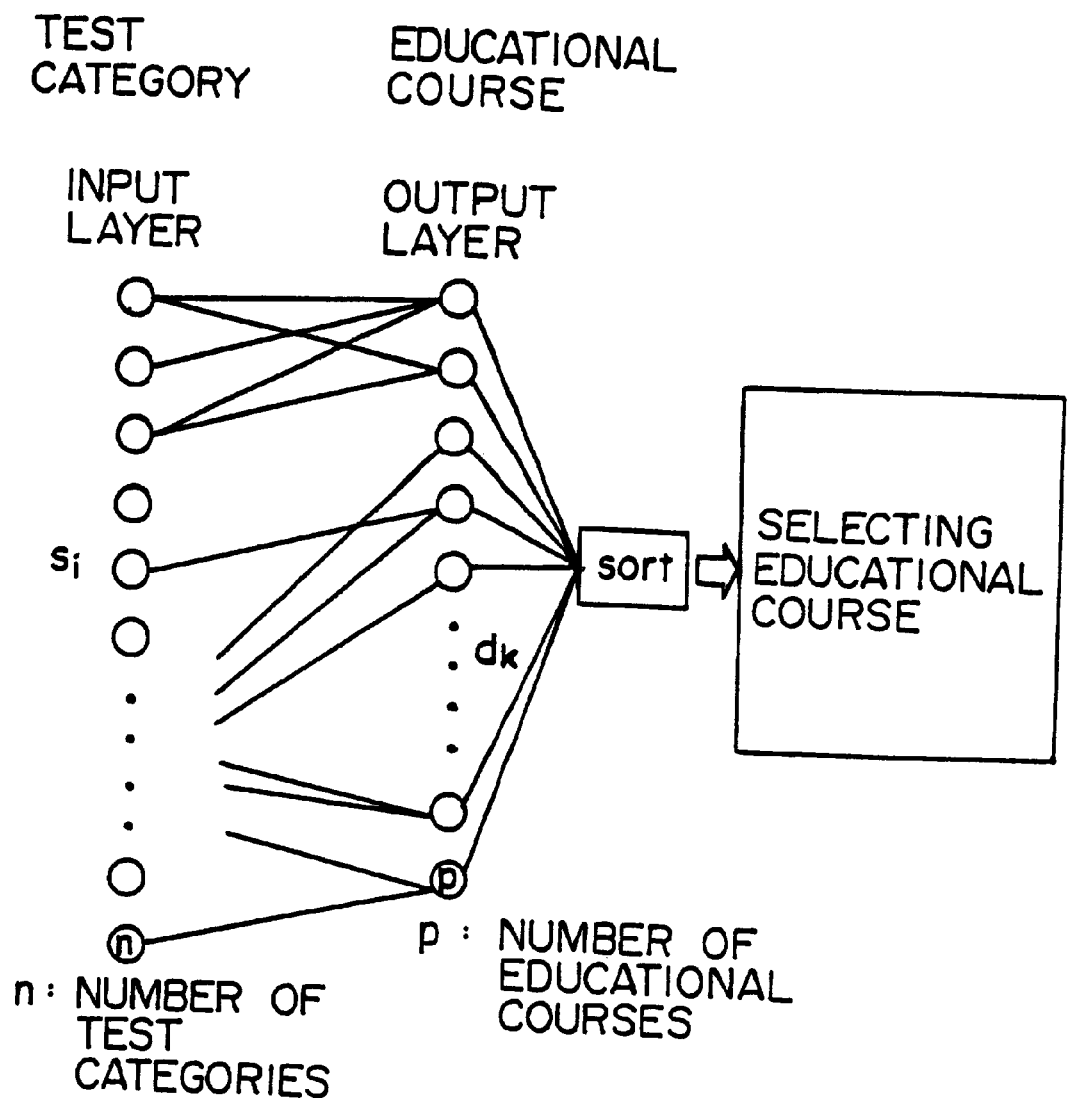
FIG. 4 shows the relationship between a test category and an educational course.

The problem that a test may belong to a test category which is not required as the premise of taking a certain educational course is shown in FIG. 4. In FIG. 4, a test category which is an input layer can or cannot be connected to an educational course which is an output layer through a line indicating whether or not the test category is required as a premise of taking the educational course.

Thus, the test category which is not a target in determining the aptitude for taking an educational course (regardless of a skill level) is constantly $s_i \times t_{ik}$ in the equation (1).

The $w_{ik}$ indicates the weight and is obtained by the following equation.

$$\frac{1}{v^2 x^2} \qquad \text{equation (2)}$$

where
- v indicates the number of test categories for which the aptitude for the premise of taking the educational course k is determined; and
- x indicates a value whichever is larger between the value of $|0-t_{ik}|$ and the value of $|100-t_{ik}|$.

$d_k$ is normalized into $d_k \leq 1$ by the weighting process. Thus, the distance of each educational course (average in all test categories about the distance obtained for each test category) can be compared based on the same scale.

It is also possible to obtain the distance by analyzing a test result based on an item response theory.

If a test result is analyzed based on the item response theory, the ability value of a tested person can be obtained regardless of the difference in problem for which the test is conducted on the tested person, and a common value relating to the characteristic (item difficulty, item discrimination power, etc.) of each problem (item) in the test can be obtained regardless of the difference in the group of tested persons. The item response theory is explained in detail in the 'Introduction to the Item Response Theory' by Kenji Ohtomo published by Taishukan Book Company in 1996.

When a test result is analyzed based on the item response theory, the distance $d_k$ is obtained using the following values for the following meanings in each of the variables in equations (1) and (2).

- $s_i$ indicates the ability value θ of a person who plans to take the course based on the item response theory ($-3 \leq s_i \leq 3$);
- $t_{ik}$ indicates the premise ability value based on the item response theory of the test belonging to the test category i in the premise of taking the educational course k ($-3 \leq t_{ik} \leq 3$); and
- x indicates a value whichever is larger between the value of $|-3-t_{ik}|$ and the value of $|3-t_{ik}|$.

Back in explaining (b) shown in FIG. 3, as a result of the test, the correct answer rate of a test for grasping the category level required to take the educational course 'NCP' is 50% and the distance is 0.05, and the correct answer rate of a test for grasping the category level required to take the educational course 'AIM/DB' is 40% and the distance is 0.07. From the results, the optimum educational course to be taken by a person who plans to take an educational course in these three educational courses is the educational course 'XSP troubleshooting' indicating the shortest distance (smallest value) between the test result and the premise correct answer rate.

Then, the information specifying the optimum educational course obtained in the process in step S102 is output from the server 11 and transmitted to the client 12. Then the name of the educational course is displayed on the display unit of the client 12, and the person who plans to take the course is informed of it (S103).

The portion (b) in FIG. 3 shows that the display unit of the client 12 displays the name of the educational course 'XSP troubleshooting'.

It is also effective that, instead of presenting the optimum educational course to a person who plans to take an educational course, educational courses are arranged in order from the shortest distance to indicate the order of appropriate educational courses.

The optimum educational course can be selected as described above by the present system.

The process shown in FIG. 5 is described below. FIG. 5 shows the procedure of selecting an educational course to be taken on the user (person who plans to take a course) side of the present system.

Before the user starts using the present system, a test containing the problems stored in a problem DB (database) 31 has already been conducted for a person who previously took each course (S201). The result of the test has been analyzed, the premise of taking each educational course has been computed (S202), and the data of the premise has been accumulated in an educational course premise DB 32. If the results of the test for the persons who previously took the course have not been sufficiently accumulated, for example, the data of the premise set by a lecturer, etc. can also be utilized.

The user (a person who plans to take a course) who requests the present system to select an educational course first roughly selects the field of a technology (S211). The names of technological fields to be selected have been accumulated in advance in a test field DB 33, and the user selects a desired name.

Then, the user has the test (S212). The problem of the test is presented after being selected depending on the selected technological field in order from the problem accumulated in the problem DB 31. After the test, the mark is given, an analysis is made, and the result is accumulated in a test result DB 34.

The method of solving a problem in steps S201 and S212 is a so-called item selection method.

Then, the server 11 selects the optimum educational course by referring to the data accumulated in the educational course premise DB 32 and the test result DB 34 (S213), and the selection result is displayed on the display unit of the client 12 to notify the user of the result (S214).

The present system can be configured such that the user of the present system can evaluate his or her own skill level by stepwise answering the questions about the skill of the user (S221) instead of having a test for selection of an educational course to be taken, thereby selecting the optimum educational course based on the self-evaluation. At this time, the result of the self-evaluation of the skill level by the user is stored in a self-evaluation DB 35, and the server 11 can select the optimum educational course by referring to the data accumulated in the educational course premise DB 32 and the self-evaluation DB 35 (S213).

It is assumed that each database of the above mentioned problem DB 31, the educational course premise DB 32, the test field DB 33, the test result DB 34, and the self-evaluation DB 35 is stored in the storage unit 23 of the server 11. It is also assumed that the storage unit 23 of the server 11 stores a user DB 36 for management of the receivers (users) of services from the server 11.

FIG. 6 shows a list of tables of each of the above mentioned databases.

The problem DB 31 stores a problem table for management of each problem, a problem selection item table for management of selection items for solution of each problem, a test definition table for management of embodiments of a test, a test category definition table for management of a test category of a problem in each test, a category name table for management of the name of a test category, and a test problem definition table for association between a test and a problem.

The test field DB 33 stores a field name table for management of the name of a field in the technological field first selected by a user.

The user DB 36 stores a user table for management of the information about the user having the right to use the present system.

The test result DB 34 stores a user test result history table for management of the analysis result of a test conducted for a user of the present system, and a user answer table for management of the answer to each problem of a test by the user.

The self-evaluation DB 35 stores a self-evaluation question table for management of each question in a set of questions for self-evaluation, a self-evaluation selection item table for management of selection items for an answer to each question, a user self-evaluation history table for management of an analysis result of a set of questions, and a user self-evaluation result table for management of an answer by a user to each question in a set of questions.

The educational course premise DB 32 stores a course information definition table for management of the name of each educational course, an educational course premise course table for association between each educational course and the premise of taking the educational course, an educational course premise test table for management of the premise of a test result for each educational course, and a self-evaluation premise table for management of the premise of the self-evaluation result of each educational course when a user evaluates himself or herself through a set of questions.

FIG. 7 shows the details of the contents of the data in each of the above mentioned tables.

The problem table contains data such as a problem ID which is an identifier for identification of each problem, a problem sentence describing a problem, the number of selection items for an answer to the problem, a correct selection item which is the number of a correct selection item of the problem, and a category ID which is an identifier of a test category to which the problem belongs.

The problem selection item table contains data such as a problem ID for association between a problem and a selection item, the number of a selection item, and words indicating the contents of the selection item.

The test definition table contains data such as a test ID which is an identifier for identification of each test, a test name indicating the name of the test, a field ID for association between the technological field first selected by a user and the test, a limited time for an answer to the test, the number of problems of the test, and the number of categories which is a total number of test categories to which each problem belongs in the test. There can be plural pieces of data about the field ID.

The test category definition table contains data such as a test ID for association between the table and a test, the number assigned to each test category as necessary in each test, and a category ID for specification of a test category corresponding to the number.

The category name table contains data such as a category ID which is an identifier for identification of each test category, and a category name indicating the name of the test category.

The test problem definition table contains data such as a test ID and a problem ID for association between the table and a test and a problem respectively, and a sequence number indicating the order of presenting problems corresponding to the problem ID in the test.

The field name table contains data such as a field ID which is an identifier for identification of each technological field to be first selected by a user, and a field name indicating the name of the technological field.

The user table contains data such as a user ID which is an identifier for identification of a user of the present system, a password set by each user to avoid false identity through an illegal use of the ID of another user, the name of a user represented by kanji and kana characters, and an electronic mail address of a user.

The user test result history table contains data such as a user ID for specification of a user, a date and time on which a test is conducted, a test ID for specification of a test conducted for a user, an ability value indicating the correct answer rate of the user relating to the test (or based on the item response theory), the level represented by a value obtained by evaluating the test result in a 5-grade evaluation system, the number of answers and no-answers of a user in the test, the time taken in answering questions in a test, and the number of correct and incorrect answers of a user in a test.

The user answer table contains data such as a user ID and a problem ID for association between the table and a user who answers questions and a problem respectively, the number of a selection item selected by the user as an answer, an evaluation result of the answer (indicating a correct answer, an incorrect answer, or a non-answer), and the above mentioned sequence number about the problem.

The self-evaluation question table contains data such as an evaluation ID which is an identifier for identification of each set of questions, an evaluation item number which is the number assigned in advance to the question, the question contents describing the contents of the question, and the selection item number (number of levels of graded evaluation) indicating the number of selection items for an answer to the question.

The self-evaluation selection item table contains data such as an evaluation ID and an evaluation item number for association between a question and a selection item, the number of a selection item, and words describing the contents of a selection item (for example, 'very confident', 'a little confident', 'so-so', 'not confident', 'not confident at all', etc.).

The user self-evaluation history table contains data such as a user ID for specification of a user, a date and time on which a set of questions are issued, an evaluation ID for specification of a set of questions answered by a user, a self-evaluation total level indicating the level of the self-evaluation of the user obtained from the entire set of questions (for example, by obtaining an average value), the number of questions in the set of questions and a time taken in answering the set of questions.

The user self-evaluation result table contains data such as a user ID and an evaluation ID for association between the table and a user who answers questions and a set of questions respectively, an evaluation item number assigned to a question in a set of questions answered by a user, and a self-evaluation level of an answer to the question.

The course information definition table contains data such as a course ID which is an identifier for identification of each educational course, and a course name indicating the name of an educational course.

The educational course premise course table contains a course ID for association between the table and each educational course, the above mentioned field ID indicating the technological field to which the educational course belongs, the total number of test categories which is used as a selection reference for an educational course to be taken, and the number of self-evaluation items indicating the total number of items of a set of questions which is used as a selection reference when an educational course is selected based on self-evaluation. There can be plural pieces of data about a field ID.

The educational course premise test table contains data such as a course ID and a category ID for association between the table and each educational course and test category respectively, and each piece of data of a premise (premise correct answer rate) requested to a test belonging to a test category as the premise of the educational course to be taken.

The self-evaluation premise table contains data such as a course ID and an evaluation ID for association between the table and each educational course and a set of questions respectively, and a premise (self-evaluation value) requested for the set of questions as the premise of taking the educational course.

Each table of each database contains the above mentioned data.

Described below is the operations shown in FIG. 8. FIG. 8 is a flowchart of the contents of the process of selecting an educational course to be taken. This process is performed to compute the weighted Euclidean distance between the above mentioned test result and the premise of taking an educational course. By the CPU 21 performing the process of selecting an educational course to be taken, the procedure in steps S102 and S103 in the procedure of (a) shown in FIG. 3. In the procedure shown in FIG. 5, the procedures in steps S213 and S214 are realized.

First, in step S301, 1 is substituted for the variable k. The variable k is a serial number assigned in advance to each educational course.

Then, it is determined in step S302 whether or not the variable k is larger than the constant p indicating the total number of educational courses to be open. If the determination result is yes, control is passed to S312. If it is no, control is passed to S303.

In step S303, 1 is substituted for the variable i. The variable i is a serial number assigned in advance to each test category to which each problem of a test belongs.

It is determined in step S304 whether or not the variable i is larger than the constant n indicating the total number of the test categories to which each problem of a test belongs. If the determination result is yes, control is passed to step S311. If it is no, control is passed to step S305.

In step S305, the premise correct answer rate $t_{ik}$ [%] of the test category to which the serial number of i is assigned is obtained. The value of $t_{ik}$ is computed in advance in the process in step S101 of (a) shown in FIG. 3.

In step S306, the value of $|0-t_{ik}|$ is compared with the value of $|100-t_{ik}|$. If the value of $|0-t_{ik}|$ is larger than the value of $|100-t_{ik}|$, control is passed to step S307. If the value of $|0-t_{ik}|$ is equal to or smaller than the value of $|100-t_{ik}|$, then control is passed to step S308.

In step S307, the value of $|0-t_{ik}|$ is substituted for the variable x, and control is then passed to step S309.

In step S308, the value of $|100-t_{ik}|$ is substituted for the variable x.

In step S309, the computation of $1/v^2 x^2$ is performed, and the computation result is substituted for the variable $w_{ik}$. In this equation, the constant v indicates the number of test categories to be determined for the aptitude to the premise of taking an educational course to which the serial number of k is assigned.

In step S310, the value of the result obtained by adding 1 to the variable i is substituted for the variable i. Then, control is returned to step S304, and the above mentioned processes are repeated.

In step S311, the value of the result obtained by adding 1 to the variable k is substituted for the variable k. Then, control is returned to step S304, and the above mentioned processes are repeated.

In step S312, 1 is substituted for the variable k.

In step S313, it is determined whether or not the variable k is larger than the constant p. If the determination is yes, then control is passed to step S319. If it is no, control is passed to step S314.

In step S314, 1 is substituted for the variable i, and 0 is substituted for the variable D(k). From the variable D(k), the weighted Euclidean distance between the premise of taking an educational course assigned the serial number of k and the test result of a person who plans to take the course can be finally obtained.

It is determined in step S315 whether or not the variable i is larger than the above mentioned constant n. If the determination result is yes, control is passed to step S318. If it is no, control is passed to step S314.

In step S316, the computation of $D(k)+w_{ik}(s_i-t_{ik})$ is performed, and the computation result is substituted for the variable $D(k)$. The constant $s_i$ indicates the correct answer rate [%] of the problem belonging to the test category assigned the serial number of i in the test results of a person who plans to take a course.

In step S317, the value of the result obtained by adding 1 to the variable i is substituted for the variable i. Then, control is returned to step S315, and the above mentioned processes are repeated.

In step S318, the value of the result obtained by adding 1 to the variable k is substituted for the variable k. Then, control is returned to step S313, and the above mentioned processes are repeated.

In step S319, the values of the variable $D(k)$ are sorted in an ascending order.

In step S320, the name of an educational course corresponding to the starting value (weighted Euclidean distance) in the sorted values of the variable $D(k)$ is output, transmitted to the client 12 from the I/F unit 24 through the network 13, and then displayed there.

In step S321, the names of the educational courses corresponding to the variable $D(k)$ are output in the order corresponding to the sorting process in the process in step S319, transmitted to the client 12, and displayed there.

After the process in step S321, the process of selecting an educational course to be taken terminates.

Then, the process of selecting an educational course to be taken according to the present system is described below by referring to the example of the values shown in FIG. 9.

The table (a) shown in FIG. 9 shows a premise of taking each educational course. For example, the educational course 1 is described below. In this example, the premise correct answer rates of 40% for category 1, 40% for category 2, and 30% for category 3 are obtained from the results of the tests conducted for the persons who previously took the course. No skill levels are required for categories 4 and 5. The table (b) shown in FIG. 9 shows the results of the test conducted for Ichiro and Shiro who are the users of the present system. For example, Ichiro has the correct answer rates of 30% for category 1, 35% for category 2, 34% for category 3, 20% for category 4, and 30% for category 5.

According to the examples of the values shown in FIG. 9, the weighted Euclidean distance between the premise of taking each educational course and a test result of Ichiro can be obtained as follows by performing the computation by the above mentioned equations (1) and (2) after the CPU 21 performs the process of selecting an educational course to be taken as shown in FIG. 8.

Educational course for Ichiro 1 = (40, 40, 30, *, *)

$$d_1 = \sqrt{\frac{(30-40)^2}{3^2 \times (100-40)^2} + \frac{(35-40)^2}{3^2 \times (100-40)^2} + \frac{(34-30)^2}{3^2 \times (100-30)^2}}$$
$$= 0.0650$$

Educational course for Ichiro 2 = (60, *, *, 65, *)

-continued $$d_2 = \sqrt{\frac{(30-60)^2}{2^2 \times (0-60)^2} + \frac{(20-65)^2}{2^2 \times (0-65)^2}} = 0.4270$$

Educational course for Ichiro 3 = (*, *, 70, 75, *)

$$d_3 = \sqrt{\frac{(34-70)^2}{2^2 \times (0-70)^2} + \frac{(20-75)^2}{2^2 \times (0-75)^2}} = 0.4478$$

Educational course for Ichiro 4 = (*, 60, *, *, 50)

$$d_4 = \sqrt{\frac{(35-60)^2}{2^2 \times (0-60)^2} + \frac{(30-50)^2}{2^2 \times (0-50)^2}} = 0.2888$$

In the equation above, * indicates a test category which is not to be determined for the aptitude to an educational course to be taken (this holds true with each equation described later).

Since it is clear that d1<d4<d2<d3, Ichiro is notified of the educational course 1 as the optimum educational course As for Shiro, the weighted Euclidean distance between the premise of taking each educational course and a test result is similarly obtained as follows.

Educational course for Shiro 1 = (40, 40, 30, *, *)

$$d_1 = \sqrt{\frac{(40-40)^2}{3^2 \times (100-40)^2} + \frac{(50-40)^2}{3^2 \times (100-40)^2} + \frac{(60-30)^2}{3^2 \times (100-30)^2}}$$
$$= 0.1533$$

Educational course for Shiro 2 = (60, *, *, 65, *)

$$d_2 = \sqrt{\frac{(40-60)^2}{2^2 \times (0-60)^2} + \frac{(70-65)^2}{2^2 \times (0-65)^2}} = 0.1710$$

Educational course for Shiro 3 = (*, *, 70, 75, *)

$$d_3 = \sqrt{\frac{(60-70)^2}{2^2 \times (0-70)^2} + \frac{(70-75)^2}{2^2 \times (0-75)^2}} = 0.0788$$

Educational course for Shiro 4 = (*, 60, *, *, 50)

$$d_4 = \sqrt{\frac{(50-60)^2}{2^2 \times (0-60)^2} + \frac{(60-50)^2}{2^2 \times (0-50)^2}} = 0.1302$$

Figure 10:
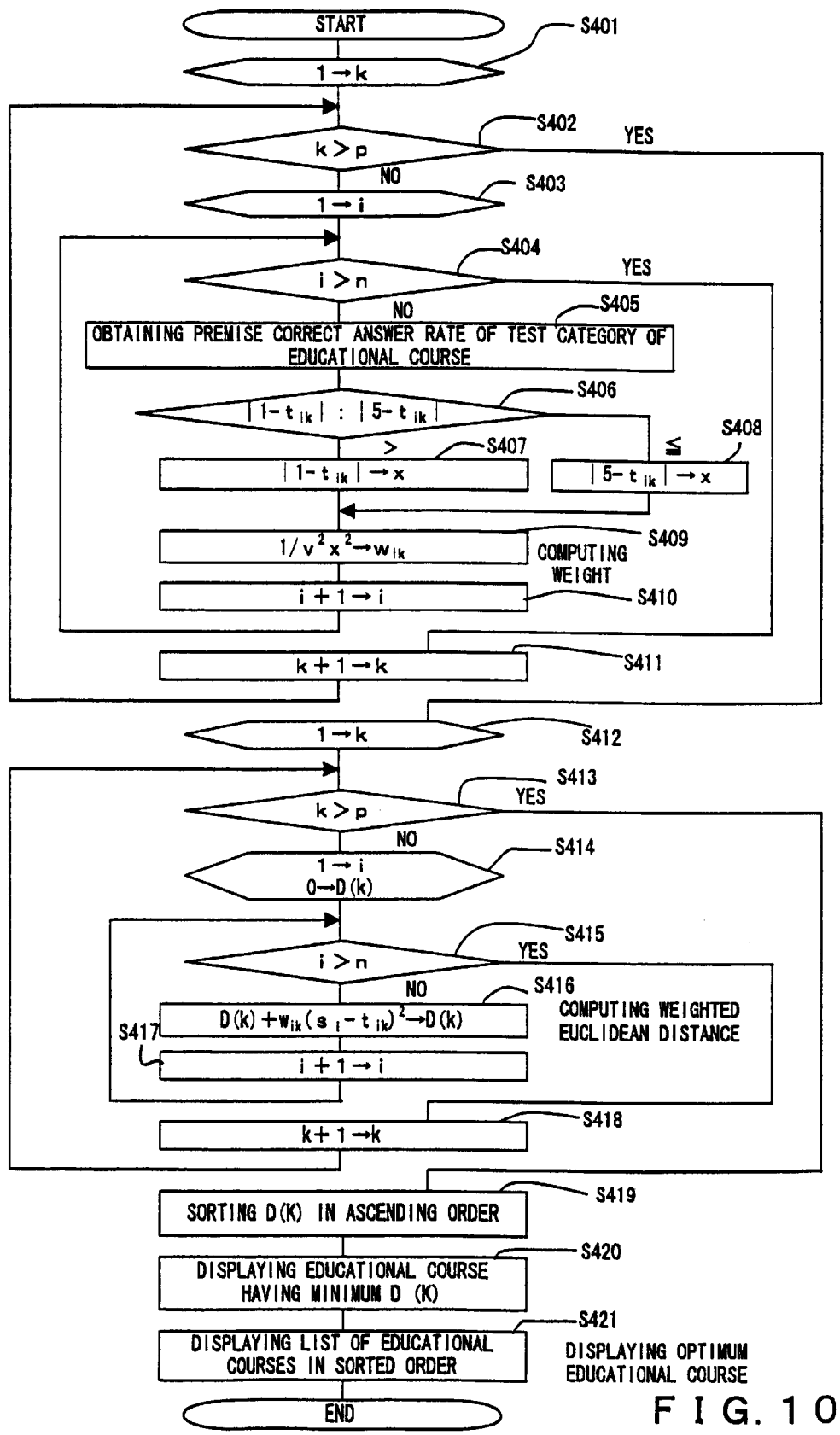
FIG. 10 is a flowchart of the contents of the process of selecting an educational course to be taken based on self-evaluation.

Since it is clear that d3<d4<d1<d2, Shiro is notified of the educational course 3 as the optimum educational course The processes shown in FIG. 10 are described below. FIG. 10 is a flowchart of the contents of the process of selecting an educational course to be taken performed by the CPU 21 when the user of the present system can evaluate his or her own skill level by stepwise answering the questions about the skill of the user.

As it is clear when FIG. 10 is compared with FIG. 8, the processes in steps S401 through S421 shown in FIG. 10 are the same as the process of selecting an educational course to be taken as shown in FIG. 8 except the processes in steps S405 through S408. Therefore, only the processes in steps S405 through S408 are described below.

The set of questions issued in this case is prepared to self-discriminate the skill level of a user in a specified technological field, and can be answered by any of 5 grades for self-evaluation such as 'very confident', 'a little confident', 'so-so', 'not confident', 'not confident at all', etc.

In the process in step S404, if it is discriminated that the variable is equal to or smaller than the constant n indicating the total number of skills inquired in each question in a set of questions, then the skill premise level $t_{ik}$ assigned the serial number of i is obtained for the educational course assigned the serial number of k in step S405. The value of $t_{ik}$ is computed in advance in the process in step S101 of the table (a) shown in FIG. 3.

In step S406, the value of $|1-t_{ik}|$ is compared with the value of $|5-t_{ik}|$. If the value of $|1-t_{ik}|$ is larger than the value of $|5-t_{ik}|$, control is passed to step S407. If the value of $|1-t_{ik}|$ is equal to or smaller than the value of $|5-t_{ik}|$, then control is passed to step S 408.

In step S407, the value of $|1-t_{ik}|$ is substituted for the variable x, and control is then passed to step S409.

In step S408, the value of $|1-t_{ik}|$ is substituted for the variable x, and control is then passed to S409.

Then, the process of selecting an educational course to be taken based on the above mentioned self-evaluation is described below by referring to an example of the value shown in FIG. 11.

The table (a) shown in FIG. 11 shows the premise of taking each educational course. For example, the educational course 1 is described below. In this case, the premise skill levels of 2 for skill 1, 2 for skill level 2, and 1 for skill 3 are obtained from the results of the self-evaluation questions, and no skill levels are required by the skills 4 and 5. The table (b) shown in FIG. 11 shows a result of a set of self-evaluation questions answered by Ichiro and Shiro. For example, the result of Ichiro is described below. That is, skill level 1 is obtained for skill 1, skill level 2 is obtained for skill 2, skill level 2 is obtained for skill 3, skill level 1 is obtained for skill 4, and skill level 2 is obtained for skill 5.

In the examples of the values shown in FIG. 11, the weighted Euclidean distance between the premise of taking each educational course and the result of the questions for self-evaluation of Ichiro is obtained by the CPU 21 performing the process of selecting an educational course to be taken as shown in FIG. 10.

Educational course for Ichiro $1 = (2, 2, 1, *, *)$ $$d_1 = \sqrt{\frac{(1-2)^2}{3^2 \times (5-2)^2} + \frac{(2-2)^2}{3^2 \times (5-2)^2} + \frac{(2-1)^2}{3^2 \times (5-1)^2}} = 0.1389$$

Educational course for Ichiro $2 = (3, *, *, 3, *)$ $$d_2 = \sqrt{\frac{(1-3)^2}{2^2 \times (5-3)^2} + \frac{(1-3)^2}{2^2 \times (5-3)^2}} = 0.7071$$

Educational course for Ichiro $3 = (*, *, 3, 4, *)$ $$d_3 = \sqrt{\frac{(2-3)^2}{2^2 \times (5-3)^2} + \frac{(1-4)^2}{2^2 \times (1-4)^2}} = 0.5590$$

Educational course for Ichiro $4 = (*, 3, *, *, 2)$ $$d_4 = \sqrt{\frac{(2-3)^2}{2^2 \times (5-3)^2} + \frac{(2-2)^2}{2^2 \times (5-2)^2}} = 0.2500$$

Since d1<d4<d3<d2 according to the computation result, the educational course 1 is selected as the optimum educational course for Ichiro, and Ichiro is notified of the selection result.

For Shiro, the Euclidean distance between the premise of taking each educational course and the result of the questions for self-evaluation of Shiro is similarly obtained as follows.

Educational course for Shiro $1 = (2, 2, 1, *, *)$ $$d_1 = \sqrt{\frac{(2-2)^2}{3^2 \times (5-2)^2} + \frac{(2-2)^2}{3^2 \times (5-2)^2} + \frac{(3-1)^2}{3^2 \times (5-1)^2}} = 0.1667$$

Educational course for Shiro $2 = (3, *, *, 3, *)$ $$d_2 = \sqrt{\frac{(2-3)^2}{2^2 \times (5-3)^2} + \frac{(3-3)^2}{2^2 \times (5-3)^2}} = 0.2500$$

Educational course for Shiro $3 = (*, *, 3, 4, *)$ $$d_3 = \sqrt{\frac{(3-3)^2}{2^2 \times (5-3)^2} + \frac{(3-4)^2}{2^2 \times (1-4)^2}} = 0.1667$$

Educational course for Shiro $4 = (*, 3, *, *, 2)$ $$d_4 = \sqrt{\frac{(2-3)^2}{2^2 \times (5-3)^2} + \frac{(3-2)^2}{2^2 \times (5-2)^2}} = 0.3005$$

Since (d1=d3)<d2<d4 according to the computation result, the educational courses 1 and 3 are selected as the optimum educational courses for Shiro, and Shiro is notified of the selection result.

According to the present embodiment, examples of selecting an appropriate educational course for a person who plans to take a course from among the educational courses open for each technology field have been described above. However, it is obvious that it is also possible to apply the present invention in selecting an appropriate educational course for a person who plans to take a course from among the educational courses open separately for each ability class such as a primary class, an intermediate class, and an advanced class, etc. depending on the difficulty of the contents of the lectures in the same technological field.

It is also possible to provide a computer-readable storage medium for storing a control program generated to direct a computer to perform the educational course selecting process shown in FIG. 8 or 10, and to allow the computer to actually select an educational course to be taken according to the present invention by reading the program from the storage medium to the computer.

Figure 12:
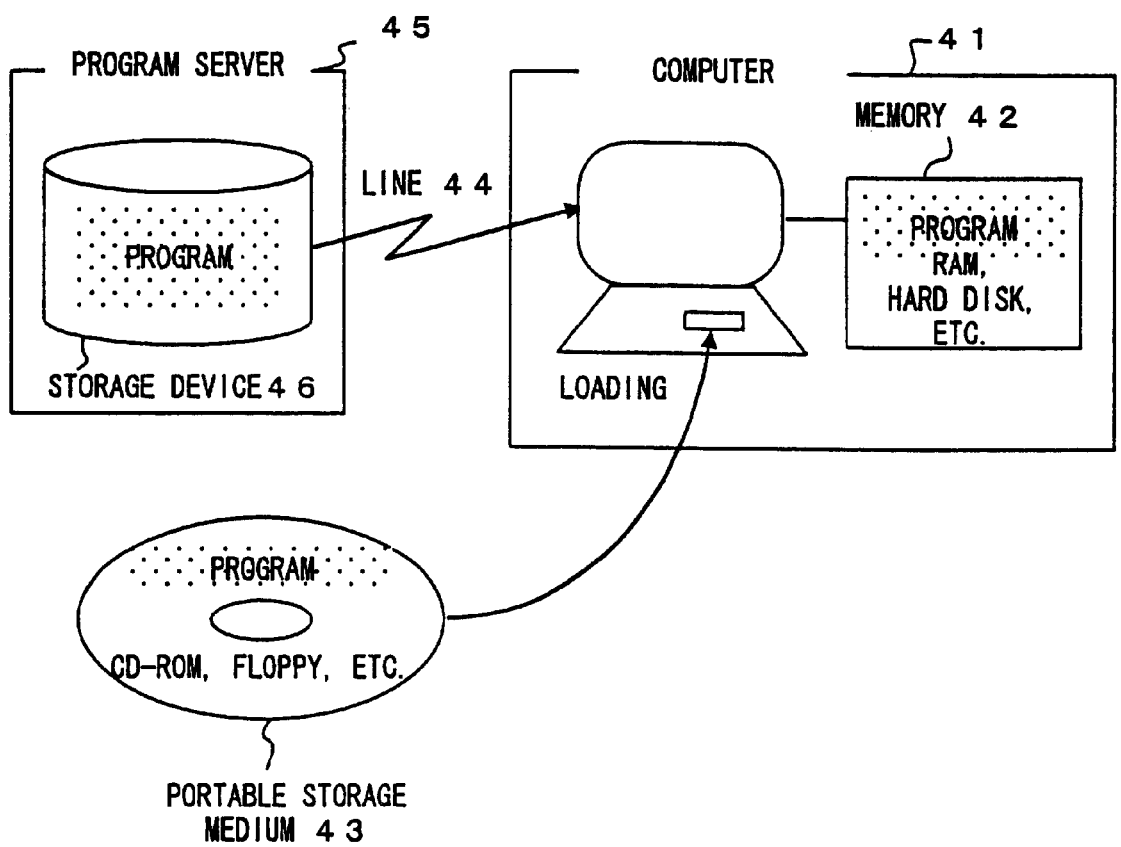
FIG. 12 shows an example of a storage medium from which a computer can read a stored control program.

FIG. 12 shows an example of a storage medium capable of reading the stored control program by a computer. As shown in FIG. 12, a storage medium can be, for example, memory 42 such as ROM and a hard disk device provided for a computer 41 as a built-in or an external peripheral device, a floppy disk, an MO (magneto-optical disk), CD-ROM, DVD-ROM, etc. In addition, it can be a storage device 46 in a program server 45 connected to the computer 41 through a line 44. In this case, a transmission signal obtained by modulating a carrier according to a data signal representing the control program is transmitted from the program server 45 through the line 44 which is a transmission medium, the computer 41 demodulates the received transmission signal, and the control program is regenerated, thereby executing the control program.

As described above in detail, according to the present invention, skill information indicating the skill of a person who plans to take a course is obtained to select an educational course to be taken by the person who plans to take a course, and an appropriate educational course for the person who plans to take a course can be correctly selected based on the similarity between the premise information which is the information about the conditions of the skill required as a premise of taking an educational course and the skill information.

With the configuration, an appropriate educational course can be selected depending on the skill level of the person who plans to take a course, and presented to the person who plans to take a course.

What is claimed is:

1. An apparatus which selects an educational course to be taken by a person who plans to take an educational course, comprising:
    an educational course selection premise information storage unit storing educational course selection premise information which is information about a condition of a skill required as a premise of taking an educational course;
    a skill information obtaining unit obtaining skill information about a skill of the person who plans to take an educational course; and
    an educational course selection unit selecting an educational course to be selected by the person who plans to take an educational course based on a distance defined between the educational course selection premise information and the skill information, wherein
        said educational course selection premise information includes a value of a first correct answer rate of a first problem of a first test conducted by a person who previously took a course;
        said skill information includes a value of a second correct answer rate of a second problem of a second test conducted by the person who plans to take an educational course, the second problem requiring a skill of a same category as the first problem of the first test conducted by the person who previously took the course; and
        said educational course selection unit selects an educational course to be taken by the person who plans to take an educational course, the selected educational course having a shortest weighted Euclidean distance between the first correct answer rate of the educational course selection premise information and the second correct answer rate of the skill information.

2. The apparatus according to claim 1, wherein
    said educational course selection premise information is generated based on a result of a test conducted for persons who previously have taken a course.

3. The apparatus according to claim 1, wherein
    said skill information is generated based on a result of a test conducted for the person who plans to take an educational course.

4. The apparatus according to claim 1, wherein
    said skill information is generated based on a result of a set of questions issued to the person who plans to take an educational course.

5. The apparatus according to claim 4, wherein
    said set of questions contains questions to be answered by self-evaluation of a skill of the person who plans to take an educational course.

6. The apparatus according to claim 1, wherein
    said educational course selection unit selects educational courses to be taken by the person who plans to take an educational course with an order assigned to each of the courses.

7. The apparatus according to claim 1, wherein said skill information refers to a value related to correct answer rate of a person who plans to take an educational course with problems requiring a skill of the same category to that required to answer problems of the test conducted to the person who previously took the educational course; and said weighted Euclidean distance is defined by:

$$d_k^2 = \sum_{i=1}^{n} w_{ik}(s_i - t_{ik})^2$$

where $d_k$ is the distance between the education course selection premise information of educational course k among a number of alternative educational courses and the result of the test conducted for the person planning to take an educational course, n is the total number of test categories into which respective problems of the test are classified, $s_i$ is the correct answer rate of the person planning to take an educational course with problems classified into test category i, $t_{ik}$ is the prerequisite rate of correct answers for problems classified into test category i among those constituting the premise associated with education course k and $w_{ik}$ is a weighting value required to normalize $d_k$.

8. An apparatus which selects an educational course to be taken by a person who plans to take an educational course, comprising:
    educational course selection premise information storage means for storing educational course selection premise information which is information about a condition of a skill required as a premise of taking an educational course;
    skill information obtaining means for obtaining skill information about a skill of the person who plans to take an educational course; and
    educational course selection means for selecting an educational course to be selected by the person who plans to take an educational course based on a distance defined between the educational course selection premise information and the skill information, wherein
        said educational course selection premise information includes a value of a first correct answer rate of a first problem of a first test conducted by a person who previously took a course;
        said skill information includes a value of a second correct answer rate of a second problem of a second test conducted by the person who plans to take an educational course, the second problem requiring a skill of a same category as the first problem of the first test conducted by the person who previously took the course; and
        said educational course selection means selects an educational course to be taken by the person who plans to take an educational course, the selected educational course having a shortest weighted Euclidean distance between the first correct answer rate of the educational course selection premise information and the second correct answer rate of the skill information.

9. A method for selecting an educational course to be taken by a person who plans to take an educational course, comprising:
    obtaining skill information about a skill of the person who plans to take an educational course from a communications network; and
    selecting an educational course to be taken by the person who plans to take an educational course having a shortest weighted Euclidean distance between a correct answer rate indicated by the educational course selection premise information and a correct answer rate indicated by the skill information as having high similarity between the educational course selection premise information and the skill information, wherein said educational course selection premise information includes a first value of a first correct answer rate of a first problem of a first test conducted by a person who previously took an educational course; and said skill information includes a second value of a second correct answer rate of a second problem in a second test conducted for the person who plans to take an educational course, the second problem requiring a skill of a same category as the first problem of the first test conducted for the person who previously took the course.

10. A computer-readable storage medium storing a control program used to direct a computer to select an educational course to be taken by a person who plans to take an educational course, said control program directing the computer to perform the processes of:

obtaining skill information about a skill of the person who plans to take an educational course from a communications network; and selecting an educational course to be taken by the person who plans to take an educational course having a shortest weighted Euclidean distance between a correct answer rate indicated by the educational course selection premise information and a correct answer rate indicated by the skill information as having high similarity between the educational course selection premise information and the skill information, wherein said educational course selection premise information includes a first value of a first correct answer rate of a first problem of a first test conducted by a person who previously took an educational course; and said skill information includes a second value of a second correct answer rate of a second problem in a second test conducted for the person who plans to take an educational course, the second problem requiring a skill of a same category as the first problem of the first test conducted for the person who previously took the course.

11. A computer program embodied on a transmission medium used to direct a computer to select an educational course to be taken by a person who plans to take an educational course, said program directing the computer to perform the processes of:

obtaining skill information about a skill of the person who plans to take an educational course from a communications network; and selecting an educational course to be taken by the person who plans to take an educational course having a shortest weighted Euclidean distance between a correct answer rate indicated by the educational course selection premise information and a correct answer rate indicated by the skill information as having high similarity between the educational course selection premise information and the skill information, wherein said educational course selection premise information includes a first value of a first correct answer rate of a first problem of a first test conducted by a person who previously took an educational course; and said skill information includes a second value of a second correct answer rate of a second problem in a second test conducted for the person who plans to take an educational course, the second problem requiring a skill of a same category as the first problem of the first test conducted for the person who previously took the course.

12. A computer data signal embodied in a carrier and representing a computer program for directing a computer to select an educational course to be taken by a person who plans to take an educational course, said program directing the computer to perform the processes of:

obtaining skill information about a skill of the person who plans to take an educational course from a communications network; and selecting an educational course to be taken by the person who plans to take an educational course having a shortest weighted Euclidean distance between a correct answer rate indicated by the educational course selection premise information and a correct answer rate indicated by the skill information as having high similarity between the educational course selection premise information and the skill information, wherein said educational course selection premise information includes a first value of a first correct answer rate of a first problem of a first test conducted by a person who previously took an educational course; and said skill information includes a second value of a second correct answer rate of a second problem in a second test conducted for the person who plans to take an educational course, the second problem requiring a skill of a same category as the first problem of the first test conducted for the person who previously took the course.

* * * * *